(12) United States Patent
Nguyen et al.

(10) Patent No.: US 7,546,861 B2
(45) Date of Patent: Jun. 16, 2009

(54) TIRE WITH TREAD HAVING CROSSED CONFIGURATION SIPE

(75) Inventors: Gia Van Nguyen, Blagny (FR); Anne-France Gabrielle Jeanne-Marie Cambron, Petange (LU); Frank Pierre Severens, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 486 days.

(21) Appl. No.: 11/474,207

(22) Filed: Jun. 26, 2006

(65) Prior Publication Data

US 2007/0295434 A1    Dec. 27, 2007

(51) Int. Cl.
    *B60C 11/12* (2006.01)
(52) U.S. Cl. .................... 152/209.18; 152/209.21; 152/209.23; 152/209.27; 152/DIG. 3
(58) Field of Classification Search ............ 152/209.18, 152/209.21, 209.23, 209.27, DIG. 3; 425/28.1, 425/35, 46
See application file for complete search history.

(56) References Cited

U.S. PATENT DOCUMENTS

| | | | | |
|---|---|---|---|---|
| 3,067,506 | A * | 12/1962 | Grant et al. | 72/324 |
| 3,402,751 | A * | 9/1968 | Jacobs | 152/DIG. 3 |
| 4,598,747 | A * | 7/1986 | Flechtner | 152/DIG. 3 |
| 6,427,737 | B1 * | 8/2002 | Katayama | 152/DIG. 3 |
| D547,259 | S * | 7/2007 | Fontaine et al. | D12/555 |
| 2002/0139164 | A1 * | 10/2002 | Ishihara | 152/DIG. 3 |
| 2005/0109438 | A1 | 5/2005 | Collette et al. | 152/209.18 |
| 2007/0095447 | A1 * | 5/2007 | Nguyen et al. | 152/DIG. 3 |
| 2007/0272337 | A1 * | 11/2007 | Bovaird et al. | 152/DIG. 3 |
| 2007/0295435 | A1 * | 12/2007 | Nguyen et al. | 152/DIG. 3 |

FOREIGN PATENT DOCUMENTS

| | | | |
|---|---|---|---|
| EP | 1073562 | | 1/2003 |
| JP | 02-246810 | * | 10/1990 |
| JP | 03-090317 | * | 4/1991 |
| JP | 04-372406 | * | 12/1992 |
| JP | 4353431 | | 12/1992 |
| JP | 9038978 | | 2/1997 |
| JP | 09-183303 | * | 7/1997 |
| JP | 09-277805 | * | 10/1997 |
| JP | 2000-225815 | * | 8/2000 |
| JP | 2001-130227 | * | 5/2001 |
| JP | 2003-118322 | * | 4/2003 |

(Continued)

OTHER PUBLICATIONS

European Search Report, completed Nov. 22, 2006.

(Continued)

*Primary Examiner*—Steven D Maki
(74) *Attorney, Agent, or Firm*—Robert N. Lipcsik

(57) ABSTRACT

A tire has a tread with a plurality of ground engaging tread elements. In at least one of the tread elements is a sipe having a depth in the radial direction of the tire. The sipe has a crossed configuration comprised of two sipes. At least one of the sipes of the crossed sipe has a radially outer portion having three dimensional elements and a radially innermost portion have a substantially linear configuration. A blade useful for manufacturing the sipe has a crossed blade configuration with a configuration corresponding to the formed sipe.

3 Claims, 4 Drawing Sheets

FOREIGN PATENT DOCUMENTS

| | | | |
|---|---|---|---|
| JP | 2005-035342 | * | 2/2005 |
| JP | 2005-104194 | * | 4/2005 |
| WO | WO 01/39996 A1 | | 6/2001 |

OTHER PUBLICATIONS

Abstract XP-002408607, Japanese Patent Application 04 353431, Dec. 8, 1992.

Abstract XP-002408608, Japanese Patent Application 02 246810, Oct. 2, 1990.

U.S. Appl. No. 29/258,802, filed Apr. 27, 2006.

U.S. Appl. No. 11/262,708, filed Oct. 31, 2005.

U.S. Appl. No. 11/474,208, filed Jun. 26, 2006.

* cited by examiner

TIRE WITH TREAD HAVING CROSSED CONFIGURATION SIPE

FIELD OF THE INVENTION

The present invention is directed towards a tire comprising sipes in the tread, and blades used for creating the sipes in the tire tread. More specifically, the present invention is directed to a tire having a tread with sipes and a blade for manufacturing the sipes, the sipes and blade having a cross configuration.

BACKGROUND OF THE INVENTION

The tread portion of a pneumatic tire generally comprises a plurality of circumferentially and laterally extending grooves defining ground engaging tread elements, the elements being in the form of blocks or ribs or combinations thereof. The particular size and shape of the tread elements contribute significantly to the overall performance of the tire and are for that reason designed to achieve the desired tire characteristics. When a tire is unworn, the relative high tread depth yields relatively low tread stiffness. However, as the tread is worn and the tread depth reduced, the tread stiffness is increased.

In addition to the grooves provided in the tread configuration, a tire tread is often provided with sipes. A sipe is a groove having a width in the range of about 0.1% to about 1% of the tread width, i.e. the arc length of the tread surface in the axial direction. The sipe tends to close when it is located in the tire footprint at zero speed and under normal load and pressure. Sipes are typically formed by steel blades inserted into a cast or machined mold or tread ring. In general, siping of conventional construction, i.e, a straight or slight curved sipe of only two dimensions, will reduce the stiffness of the tread elements in which the sipe is located.

Sipes are placed in tread elements to affect a variety of tire characteristics. One such characteristic is dry braking performance. Dry braking performance is increased with increased tread stiffness; likewise dry braking performance is decreased with reduced tread stiffness. Another tire characteristic is wet road performance. The above discussed variation in tread stiffness during the life of the tire affects a tire's wet performance characteristics as a relatively low tread stiffness is better for wet performance while a relatively high tread stiffness, in comparison, reduces the wet performance of the worn tire. This can create conflicting needs in a sipe construction.

JP 4-353431 discloses a blade; however, all of the blades disclosed therein are branched with each branch has the same configuration along the depth of the sipe and would not create a sipe that address the above conflicting characteristics.

SUMMARY OF THE INVENTION

The present invention is directed toward a tire and a tire tread having a sipe configuration designed to provide improved tire performance.

In accordance with the invention, disclosed is a tire with a tread. The tread has a tread surface and a plurality of ground engaging tread elements. At least one of the tread elements has a sipe, the sipe having a depth in the radial direction of the tire. The sipe has a crossed configuration comprised of two sipes. At least one of the sipes of the crossed sipe has a radially outer portion having three dimensional elements and a radially innermost portion have a substantially linear configuration.

In accordance with one aspect of the invention, the radially outer portion of one of the sipes of the crossed sipe has a continuous non-linear curvature in planes perpendicular to the sipe depth. This curvature gradually increases from the tread surface to the radially innermost portion of the sipe.

In accordance with another aspect of the invention, the radially outer portion of the sipe having a three dimensional radially outer portion is the uppermost 45 to 70% of the sipe depth. The substantially linear radially innermost portion is at least the lowermost 10% of the sipe depth.

In accordance with one aspect of the invention, if so desired, the radially outer portion of the sipe having a three dimensional radially outer portion may have a secondary three dimensional locking feature. Such a secondary three dimensional locking feature may be either a projecting three dimensional rectilinear configuration or a projecting three dimensional curvilinear configuration.

In accordance with one aspect of the invention, the second sipe of the crossed sipe has a non-constant profile along the depth of the sipe. Preferably, the second sipe has a radially outermost portion of constant width and a radially innermost portion of constant width, and an intermediate portion having a gradually increasing width. Similar to the first sipe of the crossed sipe, if so desired, the radially outer portion of the second sipe may also have secondary three dimensional locking features.

In accordance with one aspect of the invention, the radially outer portion of the second sipe of the crossed sipe has a three dimensional configuration differing from the radially outer portion of the first sipe of the crossed sipe. Alternatively, the second sipe has a non-constant profile along the depth of the sipe that is different from the profile of the first sipe of the crossed sipe.

Also disclosed herein is a mold blade useful for manufacturing the crossed sipe in a tire tread. The blade has a defined depth and a crossed configuration comprised of two blades. At least one of the blades of the crossed blades has an upper portion having three dimensional elements and an innermost portion having a substantially linear configuration.

In accordance with one aspect of the invention, the upper portion of one of the blades of the crossed blades has a continuous non-linear curvature in planes perpendicular to the blade depth. This curvature gradually increases from the top of the blade to the innermost portion of the blade.

In accordance with another aspect of the invention, in the mold blade, the upper portion of one of the blades of the crossed blade is has a secondary three dimensional locking feature.

In accordance with another aspect of the invention, in the mold blade, the second blade of the crossed blade has a non-constant profile along the depth of the blade. Preferably, this non-constant profile of the second blade is different from the profile of the first blade of the crossed blade.

In accordance with another aspect of the invention, the upper portion of the second blade of the crossed blade has a three dimensional configuration differing from the upper portion of the first blade of the crossed blade.

Definitions

The following definitions are controlling for the disclosed invention.

"Blade" is typical a small width element used to create a protrusion in a tire curing mold that forms part of the tread design. The protrusion forms a corresponding depression in the finished tire tread. Conventionally, a blade is distinct from a rib in a tire curing mold. A rib in a mold is also a protrusion; however, a rib forms a groove in the finished tread, while blades are used to form sipes.

"Sipes" refer to small grooves molded into tread elements of a tire that subdivide the tread elements and improve traction characteristics. Sipes have a width in the range of about 0.1% to about 1% of the tread width and tend to close completely in a tire footprint. The depth of a sipe may vary around the circumference of the tread, or the depth of one sipe may be constant but vary from the depth of another sipe in the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
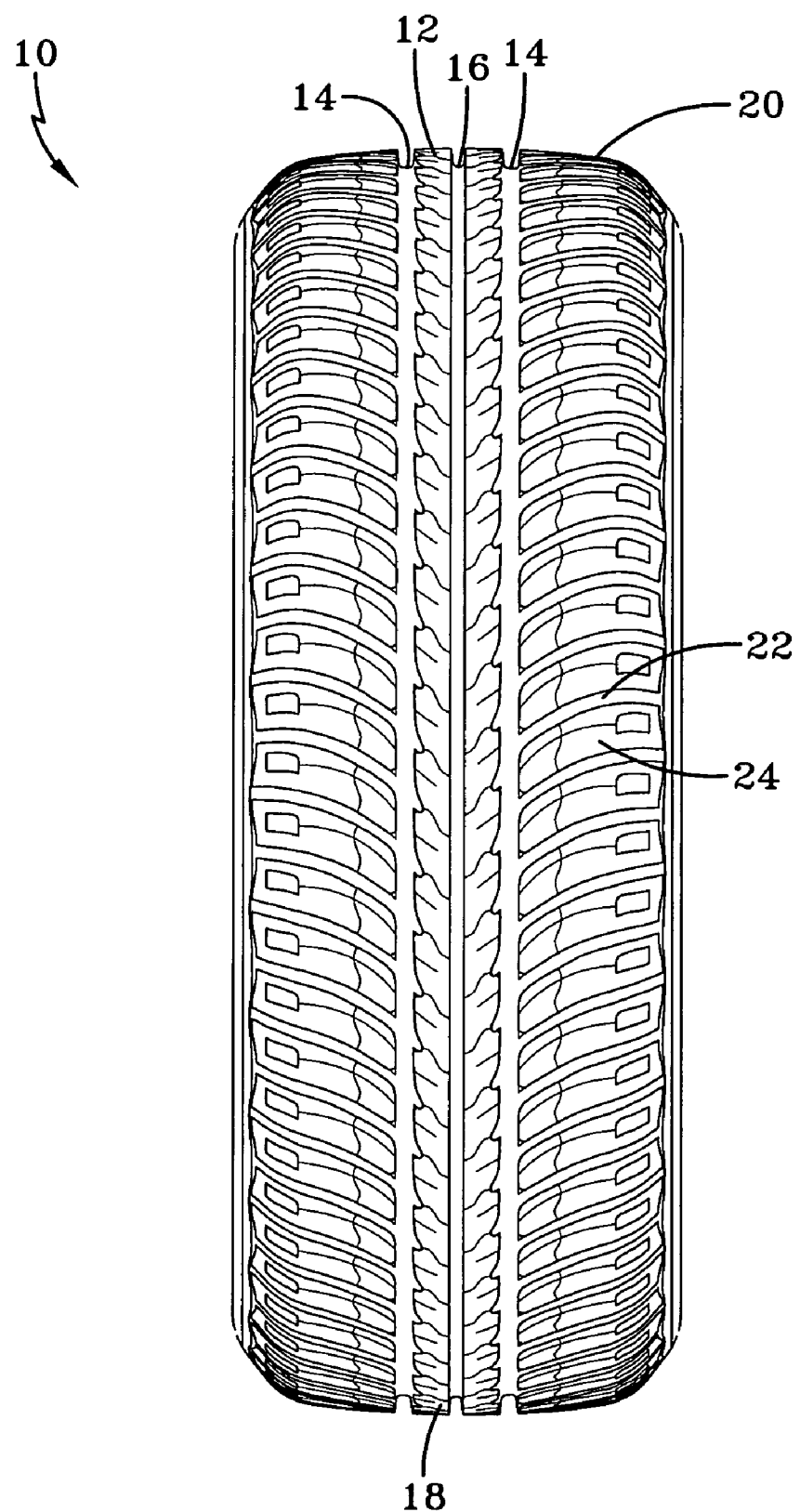
FIG. 1 is an illustration of a tire.
Figure 2:
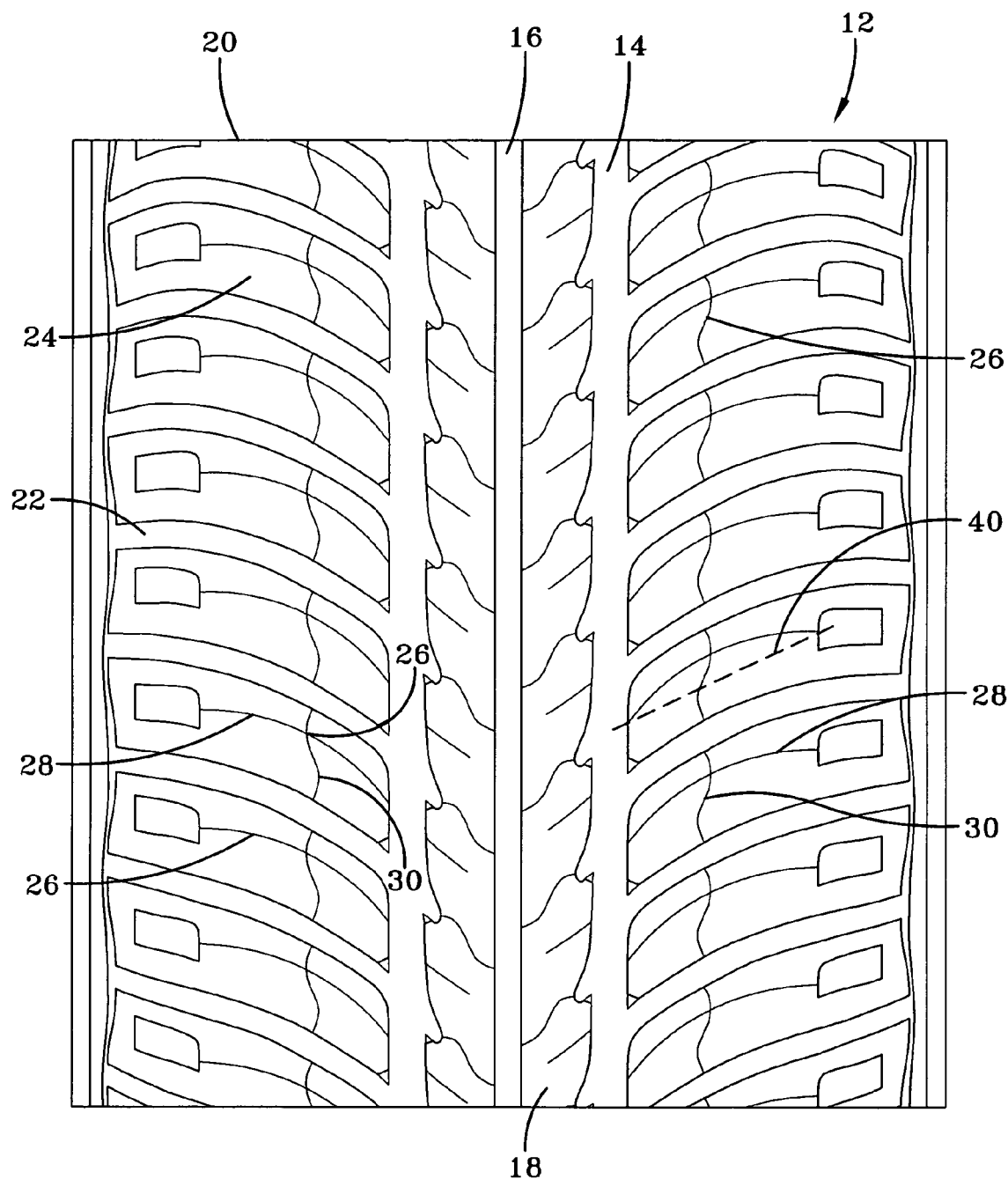
FIG. 2 illustrates the tread of the tire of FIG. 1.

FIGS. 1 and 2 illustrate a tire 10 and an exemplary tire tread 12 having a plurality of tread elements. The tread 12 has three main circumferential grooves 14, 16 extending along the circumferential direction of the tire 10. The circumferential grooves 14, 16 define two continuous ribs 18 extending along each side of the equatorial plane and partially define the tread edge element rows 20. The tread edge element rows 20 each have lateral grooves 22 extending from the tread edges to the circumferential grooves 14, forming adjacent tread blocks 24.

The tread blocks 24 have a crossed sipe 26 located therein. The crossed sipe 26 has a first sipe 28 extending in one direction, and a second sipe 30 extending in a second direction wherein the two sipes 28, 30 pass through one another to create an X, or crossed, configuration. The two different sipes 28, 30 are each selected to achieve different characteristics in the tire and tire tread. In accordance with the present invention, each sipe 28, 30 is selected to have a different non-constant profile in the depth direction of the sipe 26 and tread element 24 to provide different characteristics to the tread element 24 as the tread 12 is worn.

Figure 3:
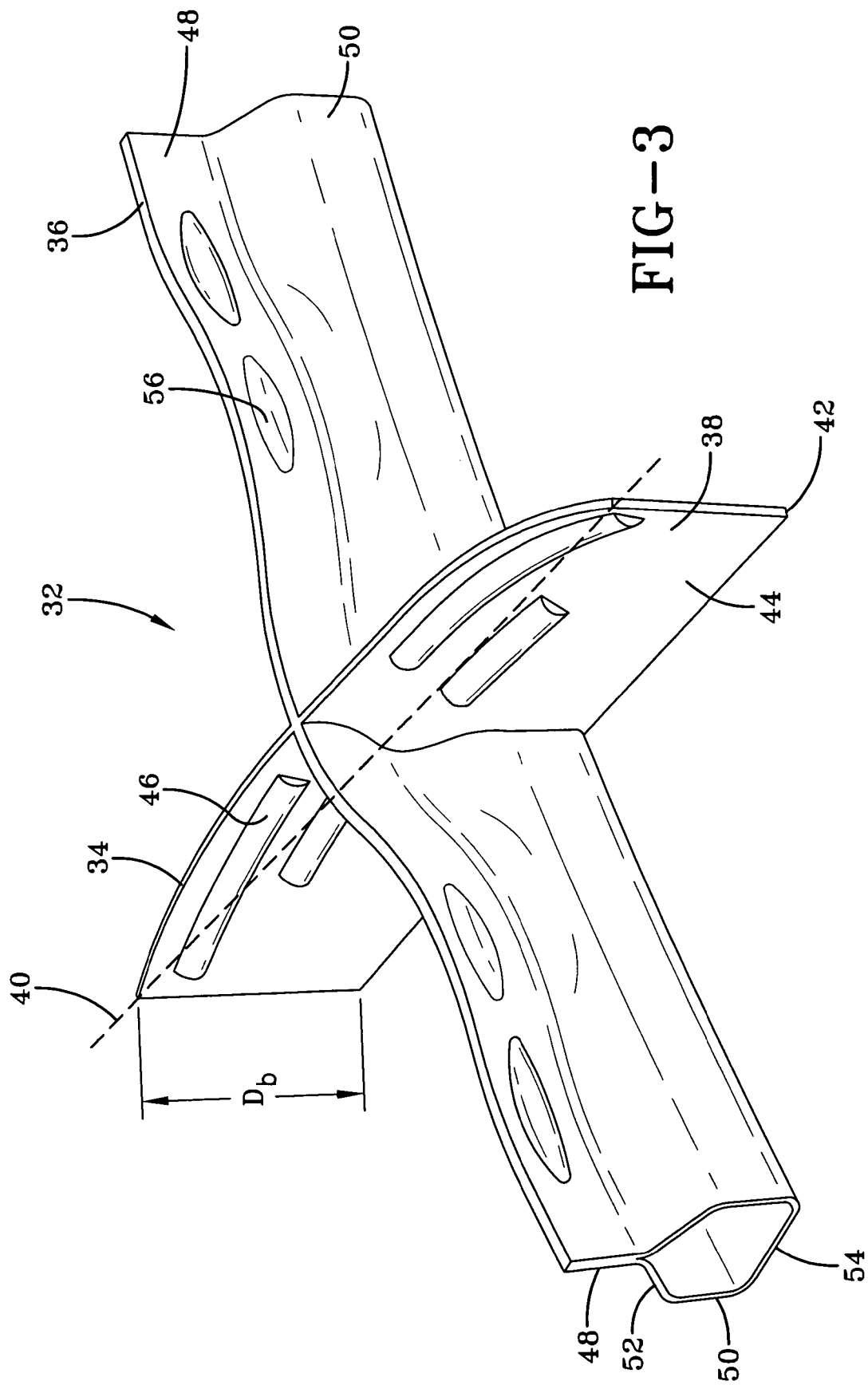
FIG. 3 illustrates a sipe mold blade.

As a sipe is a negative space created by the positive space of a sipe forming blade during manufacture of a tire, the basic details of the crossed sipe 26 are best illustrated by the crossed blade 32 used to form the sipe 26, as seen in FIG. 3. The crossed blade 32 is formed of a first blade 34 extending in one direction and a second blade 36 extending in a second direction, with the two blades 34, 36 passing through one another to create an X, or crossed, configuration. Each blade 34, 36 has a non-constant profile along the depth Db of the blade 32.

The first blade 34, and the resulting first sipe 28 created therefrom, is selected for its contribution to the braking performance of the tire 10. The upper portion 38 of the blade 34 has a continuous non-linear configuration in planes perpendicular to the depth Db of the blade 34. The curvature has at least one radius, the value of the radius gradually increasing from the top portion 38 of the blade to a lower portion of the blade 34. The upper blade portion 38 having the continuous non-linear curvature is at most the upper 90% of the blade depth Db, preferably the upper 45-70% of the blade depth Db. The continuous non-linear curvature may be defined by a single radius constant along the length of the blade 34, a parabolic curvature, or multiple adjacent curves such as a sinusoidal wave that may resemble a zig-zag pattern. The opposing sipe blade end points create a hypothetical line 40 along the length of the blade 34. This hypothetical line 40 is preferably in the same vertical plane as the blade base 42. The non-linear configuration of the upper portion 38 of the blade 34, and the corresponding resulting non-linear configuration of the radially outer portion of the sipe 28 results in a three dimensional nature to the outer portion of the sipe and the opposing sipe walls automatically locking against each other, preventing any shearing movement between the opposing sipe walls as the sipe travels through the tire contact patch.

The lower portion 44 of the first blade 34, and at a minimum the blade base 42, has a linear configuration, or a radius of infinity. The lower blade portion 44 having a linear configuration is at least the lowermost 10% of the blade depth Db, and at most, not more than the lowermost 55%, preferably not more than 30%, of the blade depth Db. The linear configuration of the lower blade portion 44 and the corresponding resulting linear configuration of the radially innermost portion of the formed sipe 28 is free of any locking of the sipe walls against shear movement, allowing the sipe walls to move against one another after the non-shearing portion of the sipe is worn away.

In addition to the gradually increasing curvature of the upper blade portion 38, the upper blade portion 38 may be provided with additional, or secondary, three dimensional locking features such as the illustrated elongated tubes 46. Other three dimensional locking features include projecting squares, tetrahedrons, prisms, pyramids, frustrums, or other multi-faceted three-dimensional rectilinear configurations, or any three-dimensional curvilinear configurations such as spheres, zones of a sphere, hemispheres, ellipsoids, catenoids, paraboloid, or truncated cylinders, or any other configurations that create a locking effect between the opposing sipe walls as the sipe 26 travels through the tire footprint contact patch.

Figure 4:
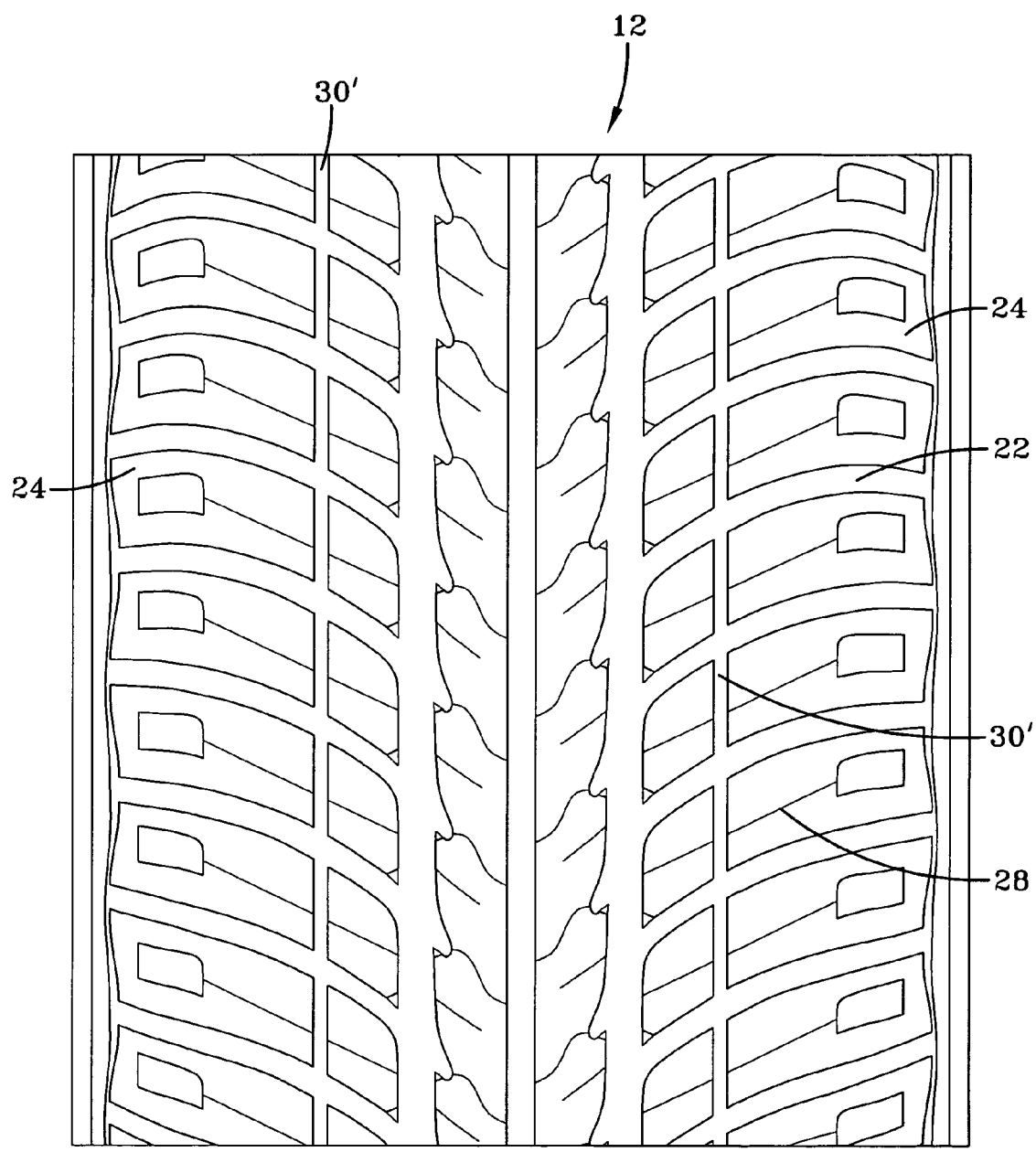
FIG. 4 is the tread of FIG. 2 after a degree of tread wear.

The illustrated second blade 36 may be termed as an evolving blade wherein the uppermost blade portion 48 has a three dimensional configuration creating a three dimensional sipe and the lowermost blade portion 50 has a width greater than the width of the upper blade portion 48. The blade 36 creates a tread feature having a conventional sipe width in an unworn tread that transforms to a tread feature having a width conventional for a groove after a predetermined amount of tread wear; see FIG. 4 showing the tread 12 and the tread elements 24 after the tread 12 has undergone at least 50% wear of the initial tread depth. The second sipe 30 of the crossed sipe 26 has transformed to a small width groove 30'.

The second blade 36 may be defined as having three portions: an uppermost portion 48, a lowermost portion 50 and a middle portion 52. The uppermost blade portion 48 is the upper of 20 to 60%, preferably 30 to 50%, of the blade depth Db, and resulting sipe depth. The lowermost blade portion 50 is the lowermost 10 to 50%, preferably 20 to 45%, of the blade depth Db, and of the resulting sipe depth. Both the uppermost and lowermost blade portions 48, 50 have a constant cross-sectional width, with the middle, or intermediate, blade portion 52 having a gradually increasing width to transition from a sipe width to a groove width.

Also, the uppermost blade portion 48 of the second blade 36, and the resulting second sipe 30, has a three dimensional configuration, different from that of the uppermost blade portion 38 of the first blade 34. This three dimensional configuration is preferably a wavy, or sinusoidal, configuration. The sinusoidal configuration may have more sharp, or defined, peaks, creating a zig-zag configuration. The lowermost portion 50 of the second blade 36, and the resulting second sipe 30, has a substantially straight configuration with a constant depth. By substantially straight configuration, it is intended that the base 54 of the second blade may be either straight or may have a slight curvature that is significantly less than the curvature of the uppermost blade portion. For example, the uppermost portion 38 of the second blade 36 may have a radius of about 6.5 mm, while the blade base 54, from end to end, has a radius of greater than 50 mm. For such a large radius of curvature for the blade base 54, when the blade has an actual short length, the blade base 54 will appear to be substantially straight.

Similar to the first blade 34, the uppermost blade portion 48 of the second blade 36 may be provided with a secondary locking features such as the illustrated alternating elongated bubbles 56. Other three dimensional locking features include projecting squares, tubes, or any of the other configurations disclosed above that create a locking effect between the opposing sipe walls as the sipe 26 travels through the tire footprint contact patch.

The two blades 34, 36 are illustrated as crossing at an approximate mid-point of the blades 34, 36; however, the crossing may occur at any location along the length of either blade 34, 36. Manufacturing of the crossed blade 32 may be accomplished by first manufacturing both blades 34, 36, dividing one of the blades 34 or 36 into two portions, and then soldering or welding the divided blade 34 or 36 on opposite sides of the other blade 36 or 34—creating a crossed blade 32. The decision of which blade to divide will likely be determined by which blade is easier to divide and then weld to the other blade. After manufacture, the blades are mounted into a tire mold by any conventional means; the attachment means being irrelevant to this invention. A green tire is then cured in the tire mold, and sipe 26 formed by the blade 32 will have all the features along the sipe depth as those discussed above for the blade 32.

With the crossed sipe 26, as the tire tread is worn and both the tread depth and the sipe depth decrease, the visual presentation of the crossed sipe 26 begins to change. The first sipe 28 of the crossed sipe 26 begins to "straighten" out as the radius of the continuous curvature increases, and the second sipe 30 begins to have an increased width. Both of the events may or may not begin at the same point in the tread wear/tread depth of the tire. Any correspondence of the change in configuration is based upon the selected depths for the different portions of the two sipes 28, 30.

While a particular crossed blade 32 with two distinct and different blades 34, 36, and the resulting sipe 26 formed therefrom is illustrated, of primary importance for the present invention is that at least one of the sipes in the crossed sipe 26 has a radially outer portion with three dimensional elements that lock the sipe walls and reduce or prevent shear movement of the opposing sipe walls and a radially innermost portion that is free of any locking against shear movement of the sipe walls. Thus, a first sipe and first blade in a crossed sipe may have upper portion formed with just locking elements such as projecting squares, or hemispheres, or cylinder portions or any other locking elements such as previously discussed. Such locking elements are disclosed in both US Patent Application 2006/0109438 A1 and EP Patent 1073562 B1, both of which are fully incorporated by reference herein. To provide the radially inner portion free of any locking against shear movement, the lower portion of a first sipe and a first blade should be defined by a linear, or substantially linear configuration.

The resulting tire having the crossed sipe, formed from the crossed blade, will have characteristics that vary in the different directions of the tire and will vary as the tire wears. The configuration of the sipe is ideally selected to provide consistent tire characteristics and performance during the entire life of the tire.

What is claimed is:

1. A tire comprising a tread, the tread having a tread surface and a plurality of ground engaging tread elements, the tread elements comprising two continuous circumferential ribs and two tread edge element rows together defining three circumferential grooves, wherein at least one of the tread elements of the two tread edge element rows has a sipe, the sipe having a depth in the radial direction of the tire, the sipe of the tire being characterized by:
    a crossed configuration comprised of a first lateral sipe portion and a second circumferential sipe portion,
    the first lateral sipe portion having a continuous non-linear, curved configuration at an upper portion of the first lateral sipe portion, the upper portion having a gradually increasing curvature as the upper portion extends radially inward to a lower portion of the first lateral sipe portion, the lower portion having a continuous linear configuration, the upper portion further having at least one elongated tubular locking feature for preventing shearing movement between opposing sidewalls of the upper portion,
    the second circumferential sipe portion having an upper portion comprising an uppermost portion of the second circumferential sipe portion and a middle portion of the second circumferencial sipe portion, the uppermost portion having a first constant width, the middle portion having a gradually increasing width as the middle portion extends radially inward to a lower portion of the second circumferential sipe portion, the lower portion having a constant second width greater than the first width, the uppermost portion further having at least one elongated elliptical locking feature for preventing shearing movement between opposing sidewalls of the uppermost portion.

2. The tire of claim 1 wherein the upper portion of the first or second portions of the sipe is the uppermost 45 to 70% of the sipe depth.

3. The tire of claim 1 wherein the lower portion of the first or second portions of the sipe is at least the lowermost 10% of the sipe depth.

* * * * *